July 19, 1949. F. K. TARRANT 2,476,465
DISPENSING AND SPREADING DEVICE
Filed March 23, 1945 2 Sheets-Sheet 2
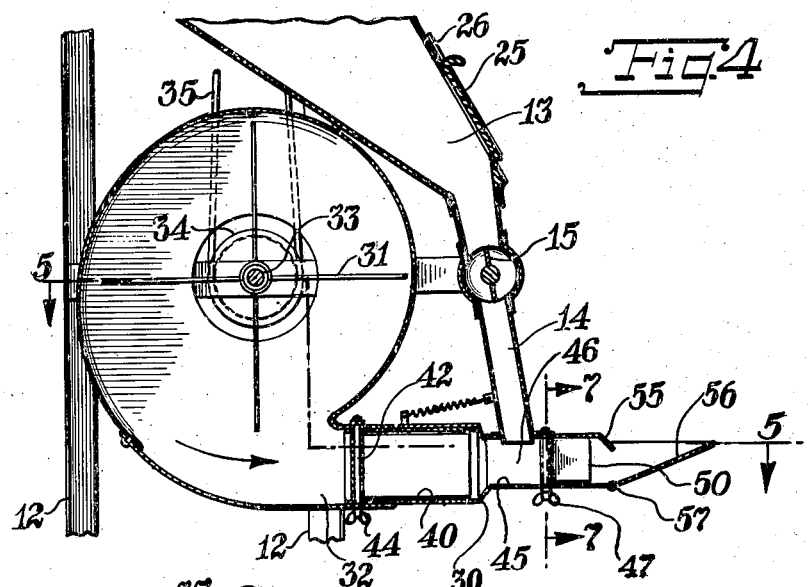
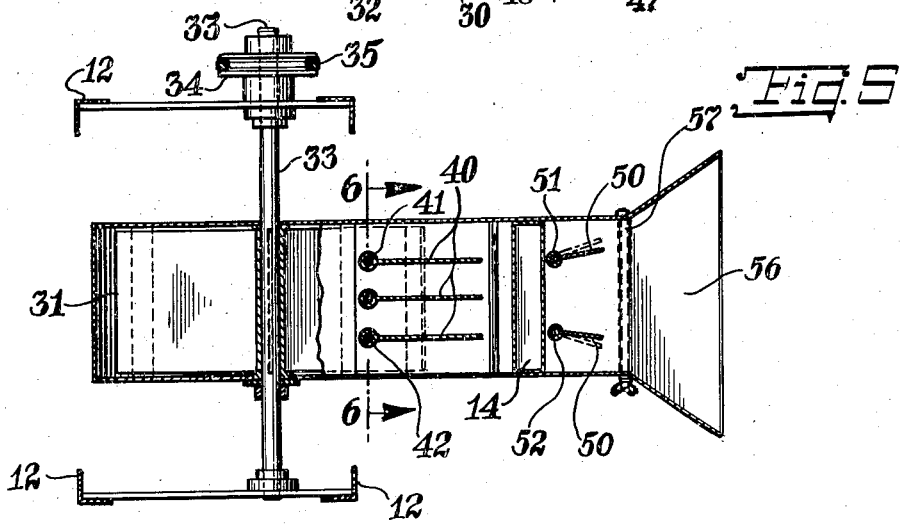
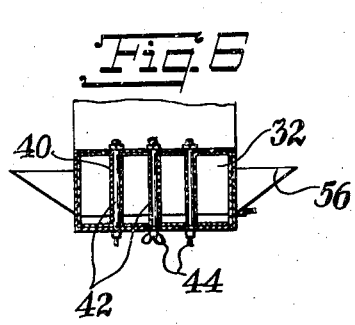
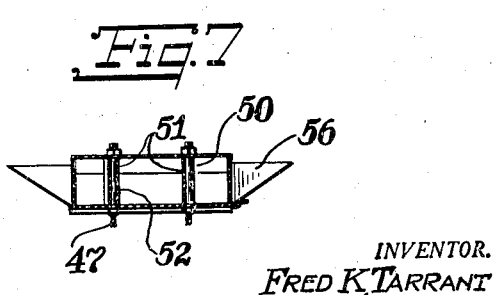
INVENTOR.
FRED K. TARRANT
BY
Luther W. Hawley Patented July 19, 1949

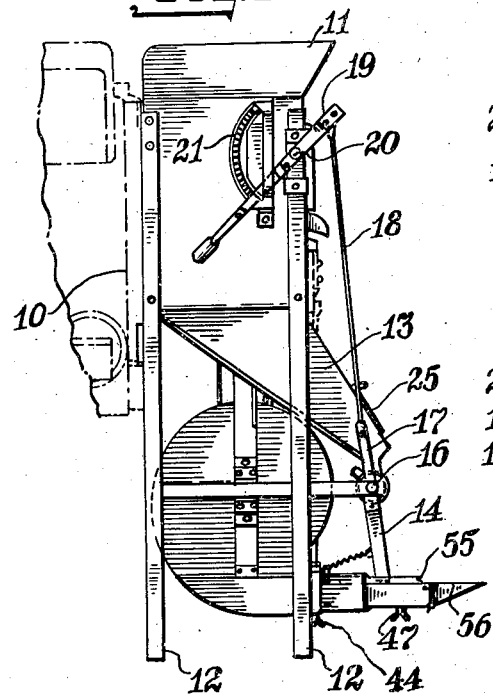
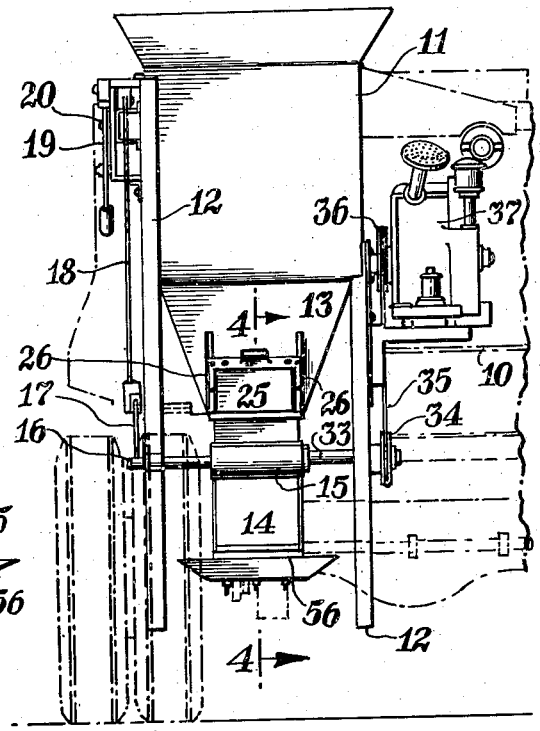
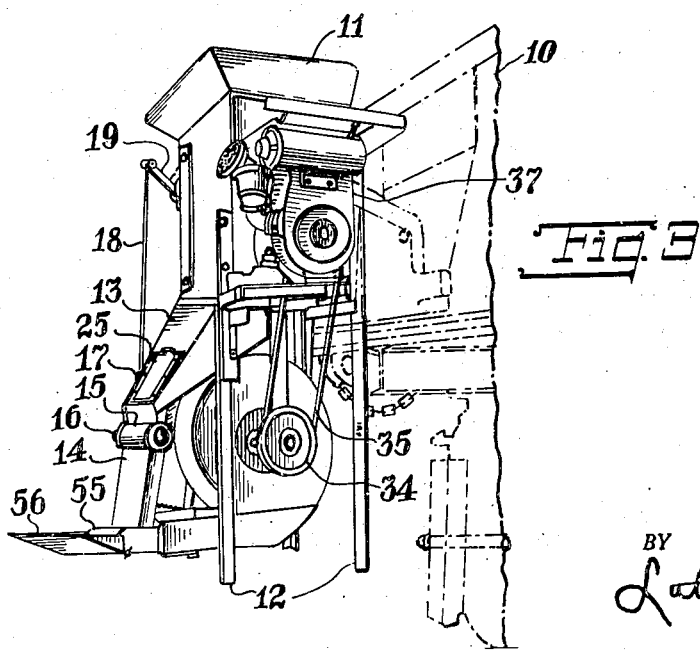

2,476,465

UNITED STATES PATENT OFFICE 2,476,465

DISPENSING AND SPREADING DEVICE

Fred K. Tarrant, Saratoga Springs, N. Y.

Application March 23, 1945, Serial No. 584,354

3 Claims. (Cl. 275—2)

This invention relates to a spreading device or spreading mechanism more particularly adapted for spreading sand, salt or like granular material on highways in order to prevent skidding or slipping due to ice or snow on the surface of the highway.

The invention has for its object to provide a device of the character specified that will scatter or spread material evenly and efficiently and can be adjusted to discharge the material in the desired direction and over a relatively wide area.

Further objects of the invention will appear from the following specification taken in connection with the drawings which form a part of this application, and in which Fig. 1 is a side elevation of a spreader device constructed in accordance with the invention and mounted on the rear end of a truck;

Fig. 2 is a view taken at right angles to Fig. 1;

Fig. 3 is a perspective view looking at the opposite side of the device from that shown in Fig. 1;

Fig. 4 is a vertical sectional elevation of the lower portion of the device taken substantially on line 4—4 of Fig. 2, looking in the direction of the arrows;

Fig. 5 is a horizontal sectional elevation taken susbtantially on line 5—5 of Fig. 4, looking in the direction of the arrows;

Fig. 6 is a transverse sectional elevation taken substantially on line 6—6 of Fig. 5, looking in the direction of the arrows; and Fig. 7 is a transverse sectional elevation taken substantially on line 7—7 of Fig. 4, looking in the direction of the arrows.

In the particular embodiment of the invention illustrated in the drawings, the device is shown as attached to the rear end or tailboard 10 of a truck. The device has a hopper 11 into which the material to be spread is dumped and the hopper has secured to its four corners, vertically disposed angle irons 12 which extend downwardly therefrom and support the spreading mechanism.

The lower end of the hopper has formed thereon or secured thereto, a downwardly extending, angularly inclined, tapered discharge passage 13, to the end of which is secured in communication therewith a relatively wide, flat, discharge spout 14. In the discharge spout there is mounted a valve 15 for controlling the passage of the material therethrough and this valve can be adjusted to wide open position, as shown in Fig. 4, or can be adjusted to narrow the passage through the spout 14 and limit the amount of material discharged therethrough. The valve 15 is mounted on a spindle or shaft 16 having a crank 17 at one end thereof which is connected by a rod 18 to a lever 19 pivoted at 20 and adjustable about its pivot to regulate the size of the opening through the discharge spout. The lever can be held in any desired position of adjustment on a rack 21 by the usual rack and pawl mechanism.

In order to give access to the chamber 13, a door 25 is slidably mounted in guideways 26.

At its discharge end the spout 14 communicates with a horizontal conduit 30 which receives the material therefrom. This material is blown through the conduit 30 by means of an air blast furnished by a fan 31 which has an outlet 32 communicating with one end of the conduit 30. The fan can be driven in any suitable manner and in the form of the invention shown the fan shaft 33 has a pulley 34 which is connected by a belt 35 to a pulley 36 on the power shaft of an engine 37.

In the conduit 30 just beyond the discharge end 32 of the blower are mounted a plurality of blades or vanes 40 which are provided for the purpose of straightening and stabilizing the air stream through the conduit and to overcome any turbulence therein. The blades 40 have sleeves or hubs 41 which are mounted on bolts 42 which extend through the top and bottom of the conduit 30 and are provided with wing nuts 44 by means of which they can be tightened. The blades can be adjusted on their pivots, if desired, but very little, if any, adjustment is necessary, the purpose of the blades being to straighten the air stream and not primarily for the purpose of deflecting the stream.

The conduit 30 is narrowed or constricted at 45, this constriction being in the nature of a Venturi passage which increases the velocity of the air passing therethrough.

In the portion 46 of the conduit 30 beyond the constriction and beyond the juncture of the discharge spout 14 therewith are provided deflecting vanes 50 which are provided with sleeves or hubs 51 mounted on bolts 52 which extend through the top and bottom walls of the conduit. Wing nuts 47 are provided for tightening the bolts and holding the vanes 50 in adjusted position. It will be evident that these vanes can be swung on their pivots in order to deflect the material which is discharged into the conduit 30 from the spout 14 and is forced through the conduit by the air blast from the fan and through the discharge outlet thereof.

At the discharge end of the conduit the upper wall or top of the conduit is bent downwardly, as shown at 55, to direct the material against a deflector or baffle plate 56 which is mounted on a bolt 57 and can be adjusted in the desired manner to deflect the material which is discharged by the air blast. If desired, the baffle could be mounted on the top instead of on the bottom wall and in that case would extend downwardly at an angle.

From the foregoing description it will be evident that the material from the hopper will be discharged effectively by the air blast and that the direction of the discharge and the area of spread can be regulated by adjusting the vanes 50 and the baffle plate 56. The amount of the material passing through the conduit 30 can be regulated by adjusting the valve 15 and ready access can be had to the discharge passage 13 by opening the door 25 whereby lumps can be removed or the material can be broken up to facilitate the discharge thereof.

Although one specific embodiment of the invention has been particularly shown and described, it will be understood that the invention is capable of modification and that changes in the arrangement and in the construction of the various cooperating parts may be made without departing from the spirit or scope of the invention, as expressed in the following claims.

What I claim is:

1. A spreading device comprising a hopper having a downwardly extending discharge passage terminating in a discharge spout, a valve for controlling the passage of material through the spout, a conduit connected intermediate its ends with said discharge spout, a fan connected to one end of said conduit, a series of transversely alined vanes in said conduit between said fan and the point of connection with said discharge spout and extending in the direction of flow of material therethrough for stabilizing the air stream through the conduit and to overcome any turbulence therein, and material deflecting means in said conduit beyond the point of junction of said discharge spout with said conduit.

2. A spreading device comprising a hopper having a downwardly extending discharge passage terminating in a discharge spout, a valve for controlling the passage of material through the spout, a conduit connected intermediate its ends with said discharge spout, a fan connected to one end of said conduit, vanes in said conduit between said fan and the point of connection with said discharge spout and extending in the direction of flow of material therethrough for stabilizing the air stream through the conduit and to overcome any turbulence therein, and material deflecting vanes in said conduit between its discharge end and the juncture of said discharge spout with the conduit.

3. A spreading device comprising a hopper having a downwardly extending discharge passage terminating in a discharge spout, a valve in said spout for controlling the passage of material therethrough, a conduit connected intermediate its ends with said discharge spout, a fan connected to one end of said conduit, vanes in said conduit between said fan and the point of connection with said discharge spout for stabilizing the air stream through the conduit and to overcome any turbulence therein, adjustable material deflecting vanes in said conduit between its discharge end and the juncture of said discharge spout with the conduit, and an adjustable material deflecting baffle plate hinged to the discharge end of said conduit extending at an angle to said adjustable material deflecting vanes.

FRED K. TARRANT.

REFERENCES CITED

The following references are of record in the file of this patent:

UNITED STATES PATENTS

| Number | Name | Date |
|---|---|---|
| 14,630 | Lawrenson | Apr. 8, 1856 |
| 339,454 | McWhorter | Apr. 6, 1886 |
| 409,578 | Gresham | Aug. 20, 1889 |
| 441,810 | Strawson | Dec. 2, 1890 |
| 555,256 | Monroe | Feb. 25, 1896 |
| 568,776 | Leggett | Oct. 6, 1896 |
| 1,310,815 | Weaver | July 22, 1919 |
| 1,948,668 | Kuchler | Feb. 27, 1934 |
| 2,011,133 | Yoss | Aug. 13, 1935 |

FOREIGN PATENTS

| Number | Country | Date |
|---|---|---|
| 180,468 | Great Britain | June 1, 1922 |
| 671,378 | France | Sept. 2, 1929 |
| 817,473 | France | May 24, 1937 |